(12) United States Patent
Park

(10) Patent No.: US 9,940,045 B2
(45) Date of Patent: Apr. 10, 2018

(54) ADDRESS MAPPING TABLE RECOVERY UPON POWER FAILURE

(71) Applicant: SK hynix Inc., Gyeonggi-do (KR)

(72) Inventor: Jeen Park, Gyeonggi-do (KR)

(73) Assignee: SK Hynix Inc., Gyeonggi-do (KR)

( * ) Notice: Subject to any disclaimer, the term of this patent is extended or adjusted under 35 U.S.C. 154(b) by 24 days.

(21) Appl. No.: 15/175,998

(22) Filed: Jun. 7, 2016

(65) Prior Publication Data

US 2017/0220274 A1   Aug. 3, 2017

(30) Foreign Application Priority Data

Feb. 1, 2016 (KR) .................. 10-2016-0012343

(51) Int. Cl.
*G06F 3/06* (2006.01)
*G06F 11/14* (2006.01)

(52) U.S. Cl.
CPC .......... *G06F 3/0619* (2013.01); *G06F 3/0655* (2013.01); *G06F 3/0679* (2013.01); *G06F 11/1451* (2013.01); *G06F 2201/84* (2013.01)

(58) Field of Classification Search
CPC .. G06F 3/0619; G06F 3/0679; G06F 11/1446; G06F 12/10
USPC ................................................ 711/103, 202
See application file for complete search history.

(56) References Cited

U.S. PATENT DOCUMENTS

| | | | |
|---|---|---|---|
| 2007/0186065 A1* | 8/2007 | Lee ..................... | G06F 3/0616 711/159 |
| 2015/0046670 A1* | 2/2015 | Kim .................... | G06F 12/0246 711/207 |
| 2015/0186224 A1* | 7/2015 | Lin ..................... | G06F 11/1469 714/6.12 |

FOREIGN PATENT DOCUMENTS

KR     1020150107401     9/2015

* cited by examiner

*Primary Examiner* — Than Nguyen
(74) *Attorney, Agent, or Firm* — IP & T Group LLP

(57) ABSTRACT

A data storage device includes a nonvolatile memory device including a memory block, to which a write operation is interrupted and not completed due to at least one time occurrence of sudden power-off (SPO) of the data storage device, wherein the memory block includes at least one first valid page group including one or more valid pages caused before the interruption and at least one invalid page group having one or more invalid pages caused by the interruption; and a controller suitable for writing at least one physical address-to-logical address (P2L) list for the first valid page group into the invalid page group after power-on of the data storage device following the SPO, and recovering an address mapping table for the memory block based on the P2L list after completion of the write operation to the memory block.

16 Claims, 8 Drawing Sheets

ADDRESS MAPPING TABLE RECOVERY UPON POWER FAILURE

CROSS-REFERENCES TO RELATED APPLICATION

The present application claims priority under 35 U.S.C. § 119(a) to Korean application number 10-2016-0012343, filed on Feb. 1, 2016, in the Korean Intellectual Property Office, which is incorporated herein by reference in its entirety.

BACKGROUND

1. Technical Field

Various embodiments generally relate to a semiconductor device and, more particularly, to a data storage device and an operating method thereof.

2. Related Art

A data storage device may store data provided from an external device, in response to a write request from the external device, and provide stored data to the external device, in response to a read request from the external device. The external device may be an electronic device capable of processing data and may include, for example, a computer, a digital camera or a mobile phone. The data storage device may be built as an integral part of the external device, or may be manufactured in a separate form which may be later coupled to the external device.

The data storage device may include, for example, a Personal Computer Memory Card International Association (PCMCIA) card, a compact flash (CF) card, a smart media card, a memory stick, a multimedia card in the form of an MMC, an eMMC, an RS-MMC and an MMC-micro, a secure digital card in the form of an SD, a mini-SD and a micro-SD, a universal flash storage (UFS), or a solid state drive (SSD).

A data storage device may include a nonvolatile memory device for storing data. A nonvolatile memory device may retain stored data even when power is not connected to the device. The nonvolatile memory device may include a flash memory device, such as a NAND flash or a NOR flash, an FeRAM (ferroelectric random access memory), a PCRAM (phase change random access memory), an MRAM (magnetic random access memory) or an ReRAM (resistive random access memory).

SUMMARY

Various embodiments are directed to a data storage device capable of shortening a mapping table recovery time, and an operating method thereof.

In an embodiment, a data storage device may include: a nonvolatile memory device including a memory block, to which a write operation is interrupted and not completed due to at least one time occurrence of sudden power-off (SPO) of the data storage device, wherein the memory block includes at least one first valid page group including one or more valid pages caused before the interruption and at least one invalid page group having one or more invalid pages caused by the interruption; and a controller suitable for writing at least one physical address-to-logical address (P2L) list for the first valid page group into the invalid page group after power-on of the data storage device following the SPO, and recovering an address mapping table for the memory block based on the P2L list after completion of the write operation to the memory block.

In an embodiment, a method for operating a data storage device including a nonvolatile memory device including a memory block, to which a write operation is interrupted and not completed due to at least one time occurrence of sudden power-off (SPO) of the data storage device, wherein the memory block includes at least one first valid page group including one or more valid pages caused before the interruption and at least one invalid page group having one or more invalid pages caused by the interruption, may include: writing at least one physical address-to-logical address (P2L) list for the first valid page group into the invalid page group after power-on of the data storage device following the SPO, and recovering an address mapping table for the memory block based on the P2L list after completion of the write operation to the memory block.

According to the embodiments, when a sudden power-off (SPO) occurs during a write operation to an open block, an invalid page storing abnormal data due to the occurrence of the SPO may be detected, and a P2L list for valid pages storing normal data before the occurrence of the SPO may be stored in the detected invalid page.

As a consequence, when generating a P2L list for a closed block for which the write operation is completed, reference may be made to the P2L list for the valid pages that is stored in the invalid page. Accordingly, it is not necessary to additionally scan the valid pages in the closed block, and thus a P2L table recovery time for the closed block may be shortened.

DETAILED DESCRIPTION

Figure 1:
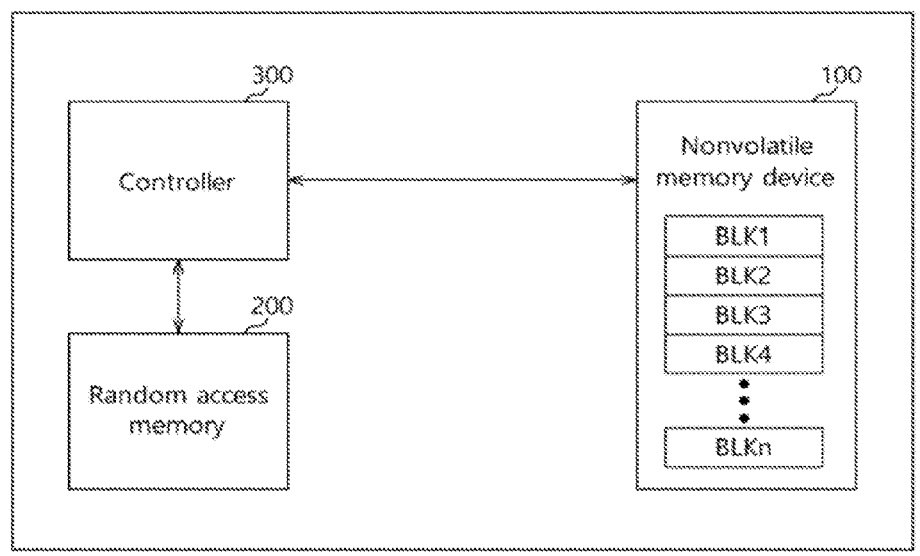
FIG. 1 is a block diagram illustrating a data storage device, according to an embodiment of the present invention.

Hereinafter, various embodiments of the present invention including a data storage device and an operating method thereof will be described with reference to the accompanying drawings.

It is noted, however, that the present invention may be embodied in various different forms, and should not be construed as being limited to the illustrated embodiments herein. Rather, these embodiments are provided as examples so that this invention will be thorough and complete, and will fully convey the various aspects and features of the present invention to those skilled in the art.

It will be also understood that, although the terms "first", "second", "third", and so on may be used herein to describe various elements, these elements are not limited by these terms. These terms are used to distinguish one element from another element. Thus, a first element described below could also be termed as a second or third element without departing from the spirit and scope of the present disclosure.

It will be further understood that when an element is referred to as being "connected to", or "coupled to" another element, it may be directly on, connected to, or coupled to the other element, or one or more intervening elements may be present. In addition, it will also be understood that when an element is referred to as being "between" two elements, it may be the only element between the two elements, or one or more intervening elements may also be present.

The terminology used herein is for the purpose of describing particular embodiments only and is not intended to be limiting of the present disclosure. As used herein, singular forms are intended to include the plural forms as well, unless the context clearly indicates otherwise.

It will be further understood that the terms "comprises", "comprising", "includes", and "including" when used in this specification, specify the presence of the stated elements and do not preclude the presence or addition of one or more other elements.

Also, when used herein, the term "and/or" includes any and all combinations of one or more of the associated listed items.

Unless otherwise defined, all terms including technical and scientific terms used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

In the following description, numerous specific details are set forth in order to provide a thorough understanding of the present disclosure. The present disclosure may be practiced without some or all of these specific details. In other instances, well-known process structures and/or processes have not been described in detail in order not to unnecessarily obscure the present disclosure.

Hereinafter, the various embodiments of the present disclosure will be described in details with reference to attached drawings.

Referring now to FIG. 1, an example of a data storage device 10 is provided, according to an embodiment of the present invention.

According to the embodiment of FIG. 1, the data storage device 10 may include at least one nonvolatile memory device 100, a random access memory 200, and a controller 300 for controlling the at least one nonvolatile memory device 100 and the random access memory 200.

The nonvolatile memory device 100 may operate as a storage medium of the data storage device 10. The nonvolatile memory device 100 may be configured, for example, as a NAND flash memory device. However, the invention may not be limited to only a NAND flash memory device. For example, the nonvolatile memory device 100 may be configured as any one of other various types of nonvolatile memory devices, such as, for example, a NOR flash memory device, a ferroelectric random access memory (FRAM) employing a ferroelectric capacitor, a magnetic random access memory (MRAM) employing a tunneling magneto-resistive (TMR) layer, a phase change random access memory (PRAM) employing a chalcogenide alloy, and a resistive random access memory (RERAM) employing a transition metal oxide, according to memory cells which construct a memory cell area (not shown).

The nonvolatile memory device 100 may include a plurality of memory blocks BLK1 to BLKn, wherein n is an integer equal to or greater than 2.

Figure 2:
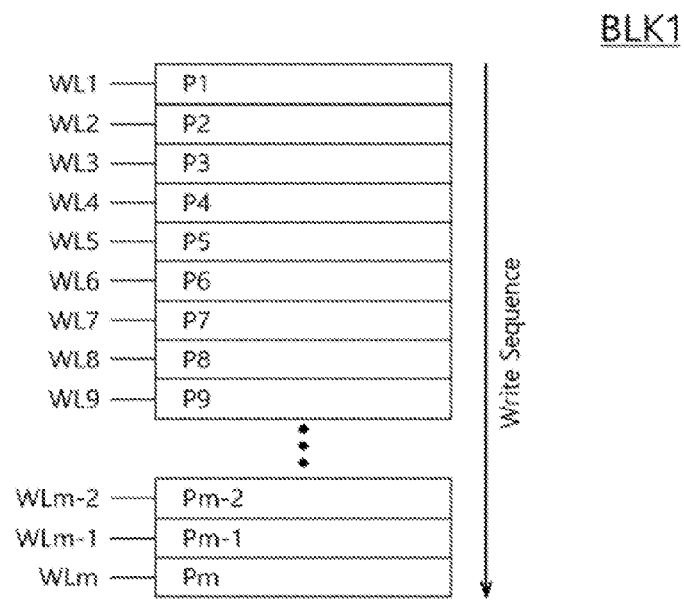
FIG. 2 is a diagram illustrating an example of a memory block included in the nonvolatile memory device of FIG. 1.

FIG. 2 is a diagram illustrating an example of a memory block BLK1 among the plurality of memory blocks BLK1 to BLKn included in the nonvolatile memory device 100 of FIG. 1.

Referring to FIG. 2, the memory block BLK1 may include a plurality of pages P1 to Pm respectively corresponding to a plurality of word lines WL1 to WLm. While it is illustrated in FIG. 2 that one page corresponds to a single word line, it is to be noted that in the present embodiment, the number of pages corresponding to a single word line may not be limited in this way. For example, the number of pages corresponding to a single word line may vary, for example, according to how many bits of data may be stored in each of the memory cells coupled to a single word line. For example, the number of pages corresponding to a single word line may vary according to whether a memory cell coupled to the single word line is an SLC (single level cell), an MLC (multilevel cell) or a TLC (triple level cell).

A page may be a unit by which the nonvolatile memory device 100 performs a write operation and/or a read operation. The nonvolatile memory device 100 may access each page by driving a corresponding word line, and perform a write operation and/or a read operation to the accessed page. For example, referring to FIG. 2, the nonvolatile memory device 100 may access a first page P1 by driving a first word line WL1 coupled to the first page P1, and perform a write operation and/or a read operation to the accessed first page P1. The nonvolatile memory device 100 may perform the write operation for the pages of the memory block sequentially in the direction indicated by the arrow, i.e., starting from the first page P1, followed by second, third, . . . and finishing with the last page Pm, as illustrated in FIG. 2.

The random access memory 200 may store a firmware or a software to be driven by the controller 300. Also, the random access memory 200 may store data necessary for the driving of the firmware or the software, for example, metadata. That is to say, the random access memory 200 may operate as a working memory of the controller 300.

The random access memory 200 may temporarily store data to be transmitted from a host device (not shown) to the nonvolatile memory device 100 or from the nonvolatile memory device 100 to the host device. The random access memory 200 may operate as a data buffer memory or a data cache memory.

The controller 300 may perform the general operations of the data storage device 10. For example, the controller 300 may control a write operation of the nonvolatile memory device 100 to store data in the nonvolatile memory device 100, in response to a write request transmitted from the host device. Also, as an example, the controller 300 may control read operation of the nonvolatile memory device 100 to read data stored in the nonvolatile memory device 100 and output the read data to the host device, in response to a read request transmitted from the host device. For example, the controller 300 may generate a write command and/or a read command for the write request and/or the read request transmitted from the host device, and may provide the generated write command and/or read command to the nonvolatile memory device 100. Then, the nonvolatile memory device 100 may perform the write operation and/or the read operation in correspondence to the write command and/or the read command provided from the controller 300.

The plurality of memory blocks BLK1 to BLKn included in the nonvolatile memory device 100 may be divided into a memory block for which a write operation is completed, a memory block for which a write operation is being performed and a memory block for which a write operation is not started. Also, a memory block for which a write operation for all of its pages has been completed will be referred to as a closed memory block (or closed block), whereas a memory block for which a write operation is not completed for all of its pages will be referred to as an open memory block (or open block).

Generally, the controller 300 may generate a physical address to logical address (P2L) list for a closed block among the memory blocks BLK1 to BLKn of the nonvolatile memory device 100, and store the generated P2L list in an address mapping table of the random access memory 200. Also, the controller 300 does not generate a P2L list for an open block for which a write operation for an open page has started, until the write operation is completed.

The controller 300 may generate the P2L list for a closed block by sequentially scanning the closed block from a last page to a first page and matching a logical block address (LBA) stored in each page and a physical address of each page.

A sudden power-off (SPO), which is an unexpected power supply interruption, may occur in the middle of a write operation to the memory block BLK1, and thus the write operation to the memory block BLK1 may not be completed due to the SPO. The SPO may cause one or more pages of the memory block BLK1 to store abnormal data. The page storing abnormal data due to the SPO may be referred to hereinafter as an invalid page.

When the data storage device 10 returns to a power-on state after a SPO, the controller 300 may detect an invalid page of the open block by sequentially scanning the open block, may generate the P2L list for the valid pages, and may write the generated P2L list for the valid pages in the invalid page due to the SPO.

Figure 3A:
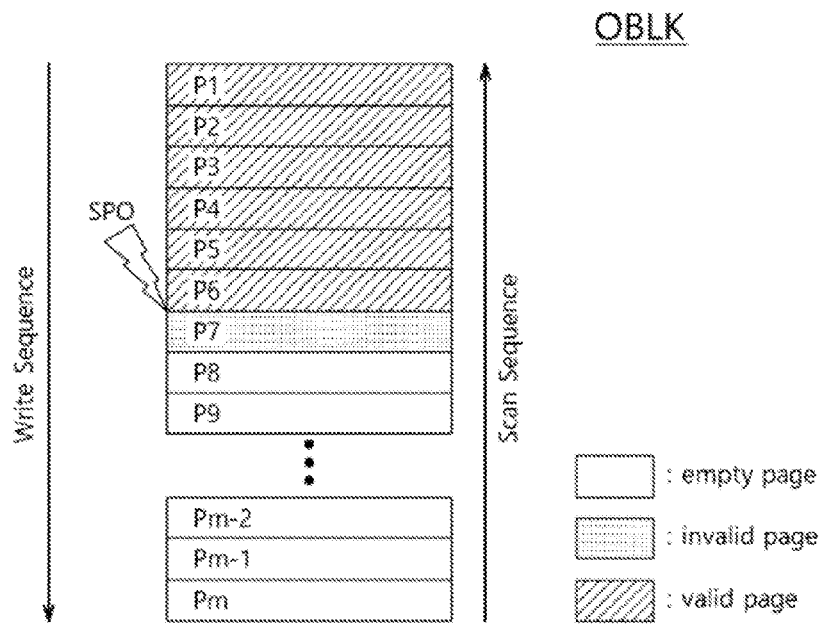
FIG. 3A is a diagram illustrating an example of an open block including an invalid page.
Figure 3B:
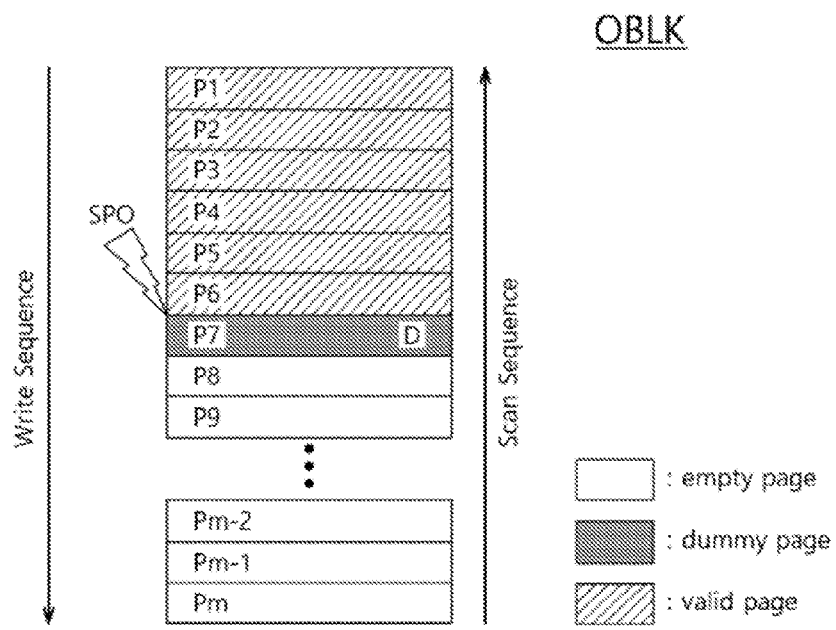
FIG. 3B is a diagram illustrating an example of generating a dummy page in the invalid page of the open block of FIG. 3A.
Figure 3C:
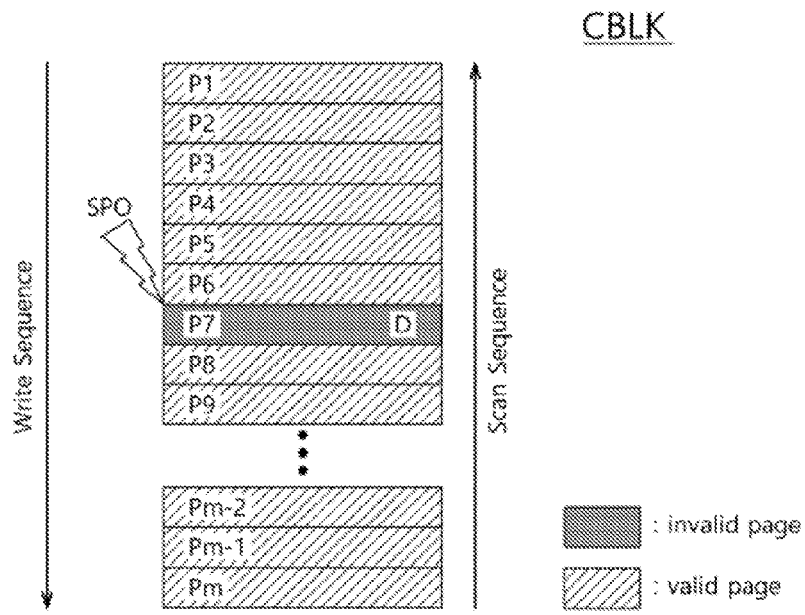
FIG. 3C is a diagram illustrating an example of a closed block for which a write operation is completed.

FIG. 3A illustrates an example of an open block OBLK including one invalid page P7, FIG. 3B illustrates an example generating a dummy page in the invalid page P7, and FIG. 3C illustrates an example of a closed block CBLK for which a write operation is completed.

For example, referring to FIG. 3A, when the SPO occurs in the middle of a write operation to a seventh page P7 of the open block OBLK and then the data storage device 10 becomes a power-on state, the controller 300 may scan the open block OBLK sequentially from an $m^{th}$ page to a first page P1. As a result of the scanning, the controller 300 may detect an empty page, the invalid page storing the abnormal data and the valid page storing the normal data in the open block OBLK. The seventh page P7 of the open block OBLK may be detected as the invalid page.

The controller 300 may generate the P2L list for the valid pages (i.e., the first page P1 to a sixth page P6) through the LBAs respectively stored in the first page P1 to the sixth page P6, and may write the generated P2L list in the invalid page (i.e., the seventh page P7). The invalid page storing the P2L list for the valid pages will be referred to as a dummy page D. The dummy page D storing the P2L list for the valid pages is not an invalid page any more. An example of generating the dummy page D is illustrated in FIG. 3B. In an embodiment, the controller 300 may store, in the dummy page D, information for debugging, for example, a firmware (FW) register value, a counter value, pointer values and an identification information indicating that a corresponding page is the dummy page D, as well as the P2L list for the valid pages.

Referring to FIG. 3C, after generating the dummy page D, the controller 300 may resume the write operation to the open block OBLK sequentially from an eighth page P8 to the $m^{th}$ page Pm, which are succeeding pages of the dummy page D. When the write operation to the last page or the $m^{th}$ page Pm is completed, the open block OBLK becomes the closed block CBLK, and the controller 300 may generate a P2L list for the closed block CBLK by performing scanning the closed block CBLK sequentially from the $m^{th}$ page Pm to the dummy page D. That is to say, it is not necessary to scan the first page P1 to the sixth page P6 since the P2L list for the valid pages (i.e., the first page P1 to the sixth page P6) is stored in the dummy page D. Accordingly, it is possible to shorten a time required for generating the P2L list for the closed block CBLK. The dummy page D may be identified through the identification information stored therein during the scanning for the P2L list for the closed block CBLK.

In an embodiment, after scanning the dummy page D, the controller 300 may determine whether the P2L list for the valid pages stored in the dummy page D is normal. If the P2L list for the valid pages stored in the dummy page D is normal, the controller 300 may generate the P2L list for the closed block CBLK by employing the P2L list for the valid pages stored in the dummy page D. If the P2L list for the valid pages stored in the dummy page D is abnormal, the controller 300 may not use the P2L list for the valid pages stored in the dummy page D, and may generate again a P2L list for the valid pages (i.e., the first page P1 to the sixth page P6) by sequentially scanning from the sixth page P6 to the first page P1.

In an embodiment, the controller 300 may generate a plurality of dummy pages for a single invalid page in the open block OBLK. For example, referring to FIGS. 3A and 4, the controller 300 may write the P2L list for the valid pages (i.e., the first page P1 to the sixth page P6) in the invalid seventh page P7 as a first dummy page D1 and the eighth page P8, which is the empty page successive to the invalid seventh page P7, as a second dummy page D2. In other words, the same P2L list for the valid pages may be written in both of the first dummy page D1 and the second dummy page D2.

Figure 4:
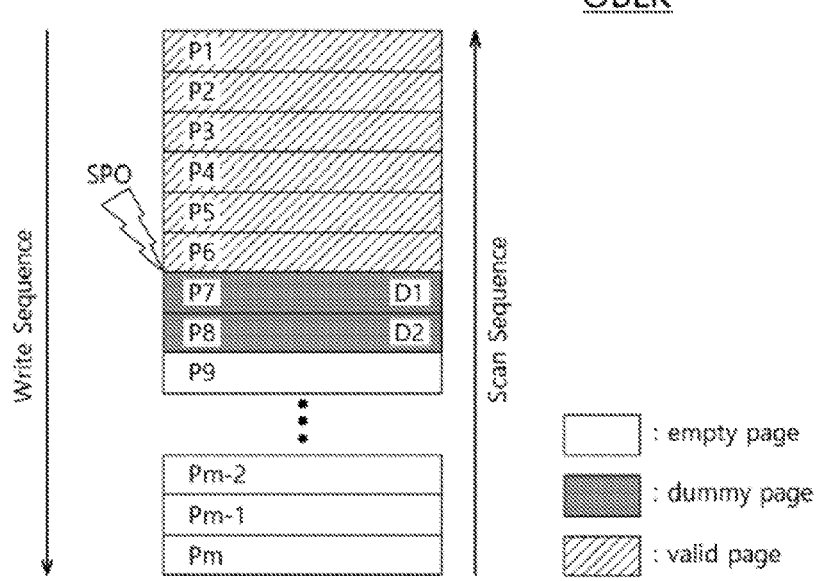
FIG. 4 is a diagram of an example of generating a plurality of successive dummy pages.

In an embodiment, the controller 300 may write information indicating a total number of the dummy pages storing the same P2L list in each of the plurality of dummy pages (e.g., each of the first dummy page D1 and the second dummy page D2). Accordingly, in the case where one of the plurality of dummy pages is abnormal, the controller 300 may use the P2L list for the valid pages stored in another one of the plurality of dummy pages. While FIG. 4 shows an example in which two dummy pages D1 and D2 are generated, it is noted that the embodiment is not limited to such an example. In a different example, at least three dummy pages may be generated.

As described above, the SPO may cause one or more pages of the memory block BLK1 to store abnormal data, which means that there may be a plurality of invalid pages in the open block OBLK due to the SPO.

Figure 5:
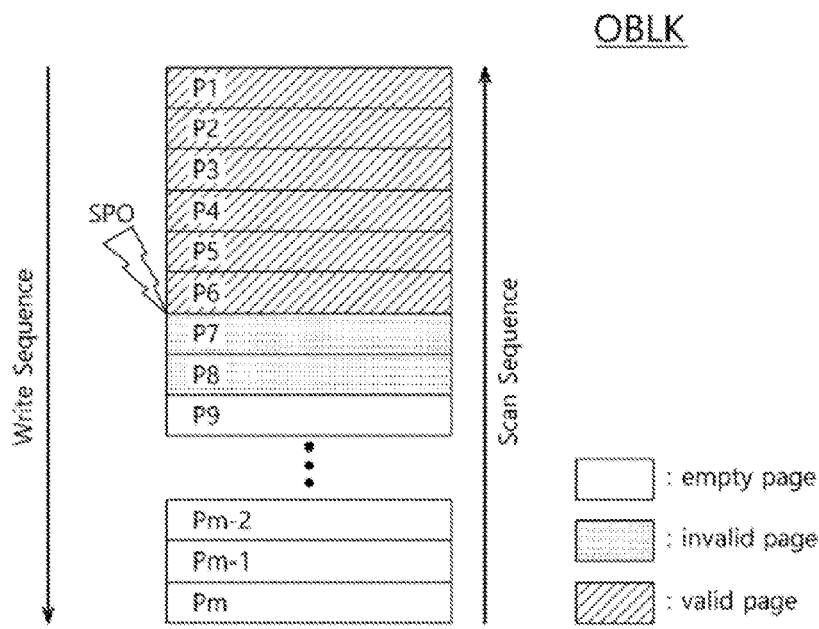
FIG. 5 is a diagram illustrating an example of an open block including a plurality of invalid pages.

According to the example of FIG. 5, it is assumed that the seventh and eighth pages P7 and P8 are both invalid pages. In this case, the controller 300 may write the P2L list for the valid pages (i.e., the first page P1 to the sixth page P6) in the invalid seventh and eighth pages P7 and P8 as first and second dummy pages D1 and D2, respectively. The same P2L list for the valid pages may be written in both of the first dummy page D1 and the second dummy page D2.

Figure 6:
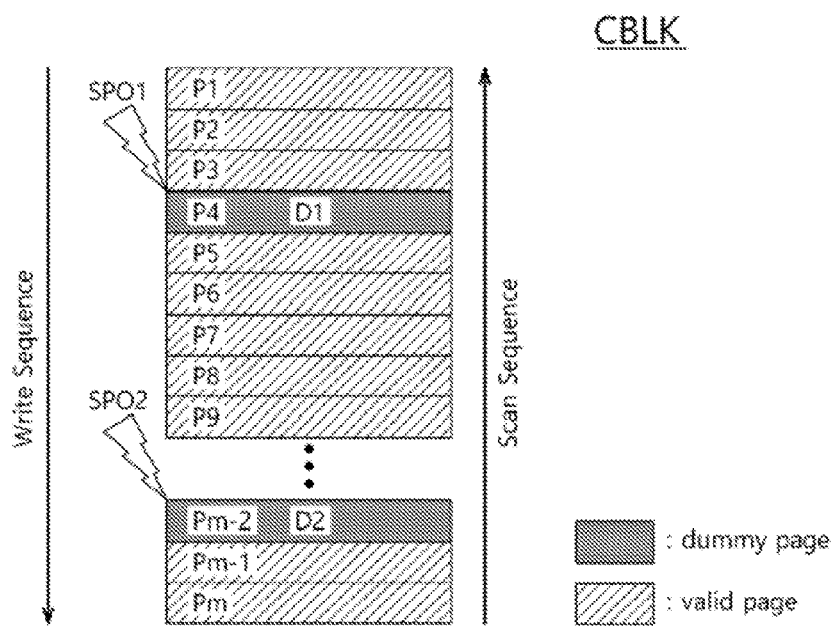
FIG. 6 is a diagram illustrating an example of generating a plurality of discontinuous dummy pages.

Meanwhile, several SPOs may occur in the middle of a write operation to a single open block OBLK. FIG. 6 shows, as an example, a closed block in which 2 SPOs occur during a write operation and 2 dummy pages are generated.

For example, referring to FIG. 6, because of a first sudden power-off SPO1 in the middle of a write operation to a fourth page P4 of an open block OBLK, the controller 300 may generate the P2L list for the first page P1 to a third page P3 as previous a first group of valid pages of the invalid fourth page P4 and write the generated P2L list for the first group of valid pages in the fourth page P4, which is to be a first dummy page D1.

Thereafter, the controller 300 may resume the write operation to the open block OBLK from a fifth page P5. Because of a second sudden power-off SPO2 in the middle of the write operation to an $(m-2)^{th}$ page Pm-2 of the open block OBLK when the data storage device 10 returns to a power-on state, the controller 300 may generate a P2L list for the fifth page P5 to an $(m-3)^{th}$ page Pm-3 (not shown) as previous the second group of the valid pages of the invalid $(m-2)^{th}$ page Pm-2 and write the generated P2L list for the second group of the valid pages in the invalid $(m-2)^{th}$ page Pm-2, which is to be a second dummy page D2. The controller 300 may write location information of the first dummy page D1 in the second dummy page D2. Here, the location information may be a header information.

Thereafter, the controller 300 may resume the write operation to the open block OBLK from an $(m-1)^{th}$ page Pm-1 to the $m^{th}$ page Pm. When the write operation to the last page or the $m^{th}$ page Pm is completed, the corresponding open block OBLK becomes a closed block CBLK. Then, the controller 300 may generate the P2L list for the closed block CBLK by scanning the $m^{th}$ page Pm to the $(m-1)^{th}$ page Pm-1, the second dummy page D2 and the first dummy page D1. Namely, since the P2L list for the second group of the valid pages (i.e., the fifth page P5 to the $(m-3)^{th}$ page Pm-3) and the header information of the first dummy page D1 are stored in the second dummy page D2 and the P2L list for the first group of the valid pages (i.e., the first page P1 to the third page P3) is stored in the first dummy page D1, the controller 300 does not need to scan the first and second groups of the valid pages.

Figure 7:
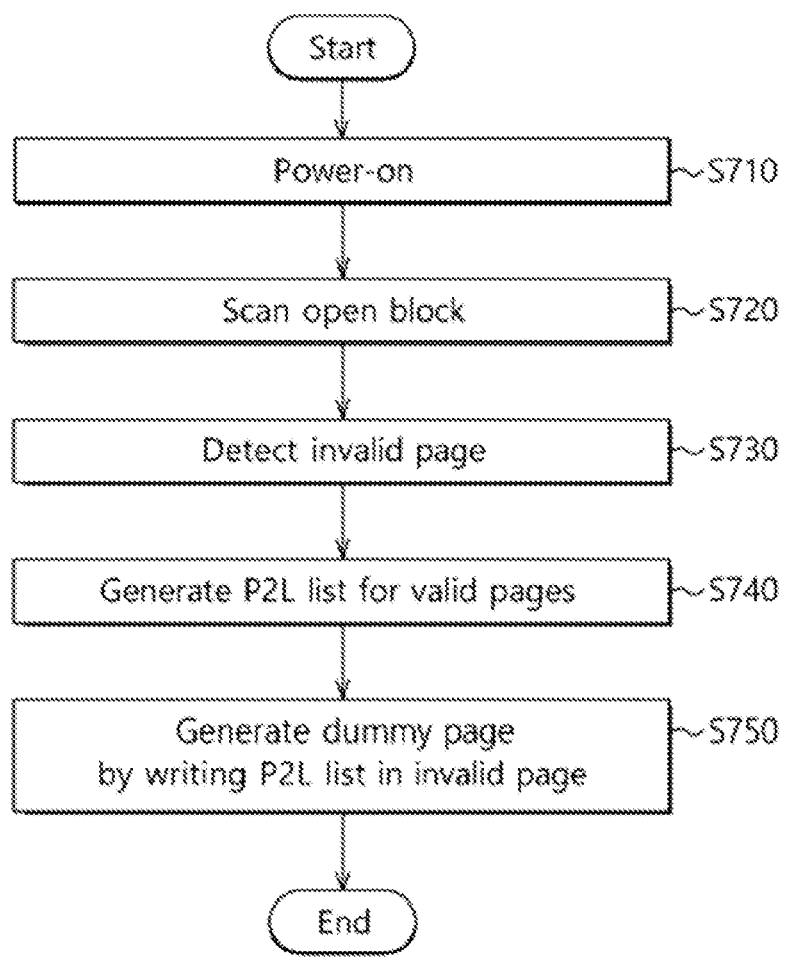
FIG. 7 is a flow chart of a dummy page generating method in a method for operating a data storage device, according to an embodiment of the present invention.

FIG. 7 is a flow chart of a dummy page generating method in a method for operating a data storage device, according to an embodiment of the invention.

Referring to FIGS. 1 to 7, the dummy page generating method according to an embodiment includes the following steps. At step S710, the data storage device 10 is powered on from a power-off state due to an SPO. At step S720, the controller 300 may scan all the pages of the open block OBLK. For example, the controller 300 may scan the open block OBLK sequentially from an met page Pm to a first page P1.

At step S730, the controller 300 may detect the invalid page in the open block OBLK through the scanning step S720. Also, the controller 300 may determine valid pages and empty pages in the open block OBLK. At step S740, the controller 300 may generate the P2L list for the valid pages (i.e., the valid pages located before the invalid page in order of the write operation), in the open block OBLK (S740).

At step S750, the controller 300 may generate the dummy page D by storing the P2L list for the valid pages in the invalid page (S750). The dummy page D storing the P2L list for the valid pages is not the invalid page any more.

Various embodiments for generating the dummy page D are described with reference to FIGS. 4 to 6.

After generating the dummy page D, the controller 300 may resume the write operation to the open block OBLK from the first empty page successive to the dummy page D. The open block OBLK may become the closed block CBLK upon completion of the write operation to all of its pages therein.

Figure 8:
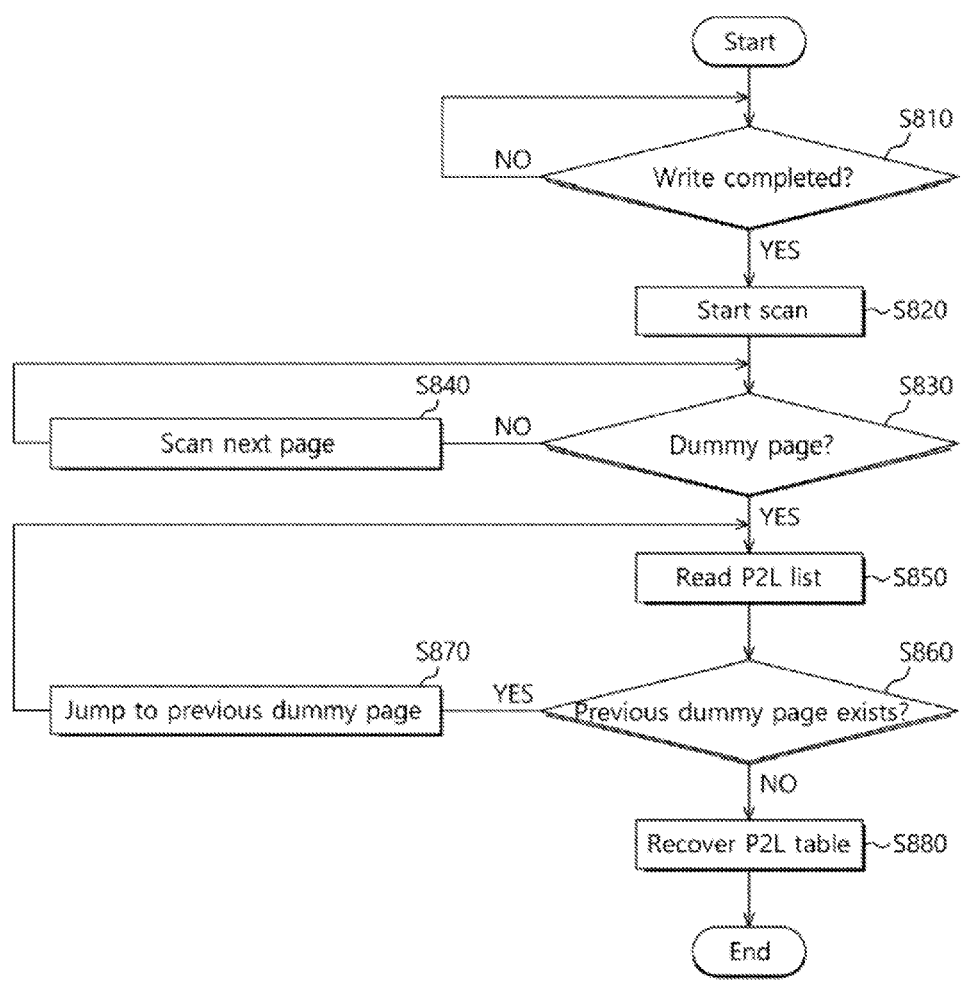
FIG. 8 is a flow chart of a mapping table managing method in a method for operating a data storage device, according to an embodiment of the present invention.

FIG. 8 is a flow chart of a mapping table managing method in a method for operating a data storage device, according to an embodiment of the present invention.

Referring to FIGS. 1 to 6 and 8, the mapping table managing method according to the present embodiment is as follows. At step S810 after the data storage device 10 is powered on following an SPO, the controller 300 may detect the closed block CBLK.

At step S820, the controller 300 may start scanning each page of the closed block.

For each scanned page, the controller 300 may determine whether the scanned page is a dummy page through the identification information stored in the scanned page at step S830. In the case where the currently scanned page is not a dummy page as a result of the determination of step S830, the controller 300 may successively scan a next page at step S840. The next page may be the page located before the currently scanned page in the order of the write operation. The steps S830 and S840 may be iteratively performed until a currently scanned current page is a dummy page.

In the case where a scanned current page is a dummy page, the controller 300 may read the P2L list for the valid pages stored in the current dummy page at step S850. Here, the P2L list may be a P2L list for valid pages located before the current dummy page in the order of the write operation. The controller 300 may determine whether a previous dummy page located before the current dummy page in order of the writ operation exists at step S860. As exemplified above with reference to FIG. 6 wherein several SPOs in the middle of a write operation to a single open block OBLK occurred, the controller 300 may write the location information of the previous dummy page (i.e., the first dummy page D1) as the header information in the current dummy page (i.e., the second dummy page D2). Accordingly, the controller 300 may identify the existence and location of the previous dummy page according to the header information stored in the current dummy page.

When the previous dummy page exists as a result of the determination of step S860, the controller 300 may jump from the current dummy page to the previous dummy page, scan the previous dummy page at step S870, and repeat step S850 for the previous dummy page. In other words, valid pages between the current dummy page and the previous dummy page are not scanned. The above-described steps S850 to S870 may be iteratively performed for entire dummy pages included in the closed block.

When a previous dummy page does not exist as a result of the determination of step S860, the controller 300 may generate the P2L list for the entire closed block by employing the P2L list for the valid pages stored in the entire dummy pages, and may recover the address mapping table of the random access memory 200 by employing the generated P2L list for the closed block.

Figure 9:
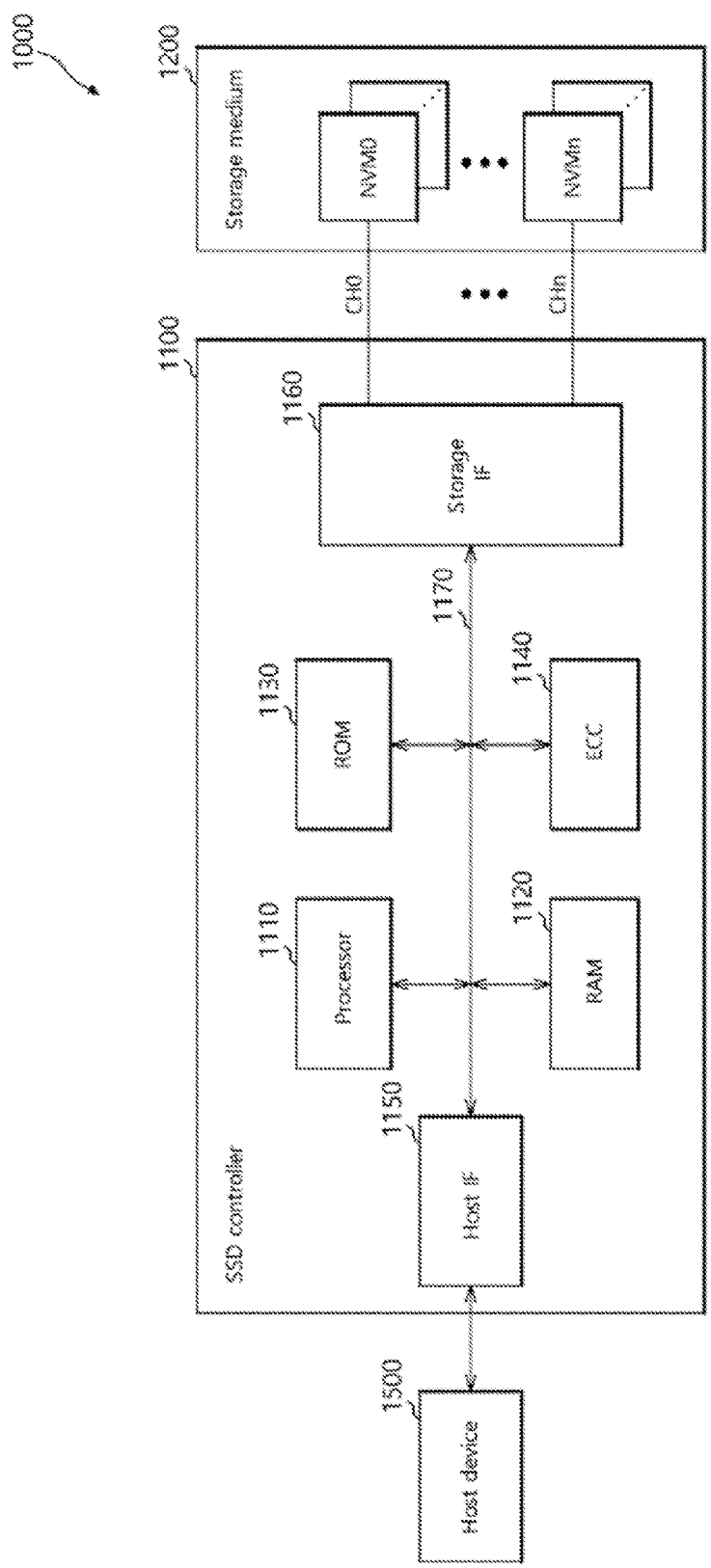
FIG. 9 is a block diagram illustrating a solid state drive (SSD), according to an embodiment of the present invention.

Referring now to FIG. 9 a solid state drive (SSD) 1000 is provided, according to an embodiment of the invention.

The SSD 1000 may include an SSD controller 1100 and a storage medium 1200.

The SSD controller 1100 may control the data exchange between a host device 1500 and the storage medium 1200. The SSD controller 1100 may include a processor 1110, a RAM 1120, a ROM 1130, an ECC unit 1140, a host interface unit 1150, and a storage interface unit 1160.

The SSD controller 1100 may operate in a manner substantially similar to the controller 300 of FIG. 1.

The processor 1110 may control the general operations of the SSD controller 1100. For example, the processor 1110 may write data in the storage medium 1200 and read stored data from the storage medium 1200 according to requests from the host device 1500. For efficiently managing the storage medium 1200, the processor 1110 may control one or more internal operations of the SSD 1000, such as, for example, a merge operation, a wear leveling operation, and so forth.

The RAM 1120 may store programs and program data to be used by the processor 1110. The RAM 1120 may temporarily store the data transmitted from the host interface unit 1150 before transferring it to the storage medium 1200. The RAM 1120 may temporarily store the data transmitted from the storage medium 1200 before transferring it to the host device 1500.

The ROM 1130 may store program codes to be read by the processor 1110. The program codes may include instructions to be processed by the processor 1110 for the processor 1110 to control the internal units of the SSD controller 1100.

The ECC unit 1140 may encode data to be stored in the storage medium 1200, and may decode data read from the storage medium 1200. The ECC unit 1140 may detect and correct an error occurred in data, according to an ECC algorithm.

The host interface unit 1150 may exchange requests, data, etc. with the host device 1500.

The storage interface unit 1160 may transmit control signals and data to the storage medium 1200. The storage interface unit 1160 may be transmitted with data from the storage medium 1200. The storage interface unit 1160 may be electrically coupled with the storage medium 1200 through a plurality of channels CH0 to CHn (n is an integer equal to or greater than 2).

The storage medium 1200 may include a plurality of nonvolatile memory devices NVM0 to NVMn. Each of the plurality of nonvolatile memory devices NVM0 to NVMn may perform a write operation and a read operation according to control of the SSD controller 1100. Each of the plurality of nonvolatile memory devices NVM0 to NVMn may be configured and operate in a manner substantially similar to the nonvolatile memory device 100 of FIG. 1.

Figure 10:
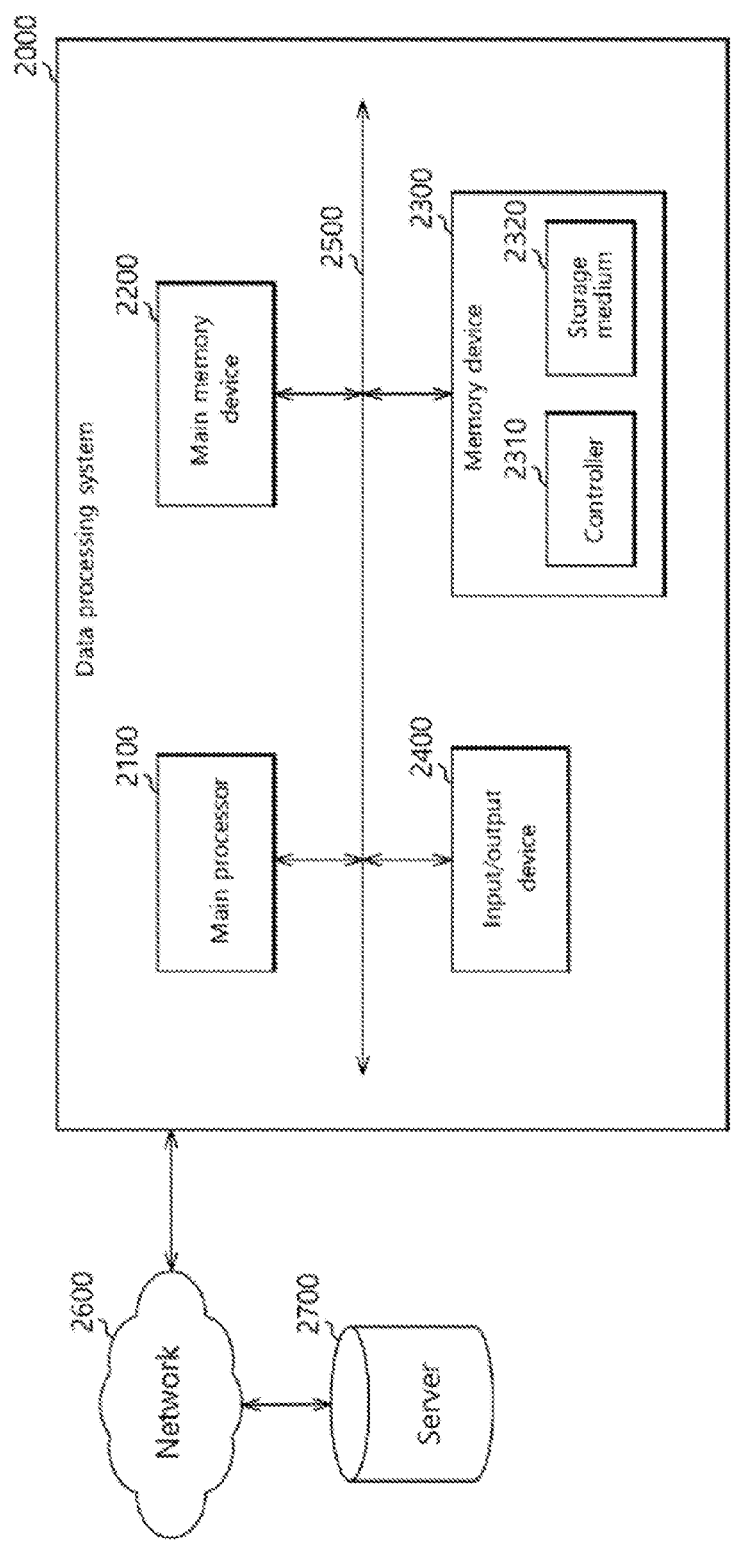
FIG. 10 is a block diagram illustrating a data processing system including a data storage device, according to an embodiment of the present invention.

FIG. 10 is a block diagram illustrating a data processing system 2000 including the data storage device 10, according to the embodiment is applied.

Referring to FIG. 10, the data processing system 2000 according to an embodiment may be or include a computer, a laptop, a netbook, a smart phone, a digital TV, a digital camera, a navigator, and the like. According to the embodiment illustrated in FIG. 10, the data processing system 2000 may include a main processor 2100, a main memory device 2200, a memory device 2300, and an input/output device 2400. The internal units of the data processing system 2000 may exchange data, control signals, etc. through a system bus 2500.

The main processor 2100 may control the general operations of the data processing system 2000. The main processor 2100 may be a central processing unit, for example, such as a microprocessor. The main processor 2100 may execute softwares such as an operation system, an application, a device driver, and so forth, on the main memory device 2200.

The main memory device 2200 may store programs and program data to be used by the main processor 2100. The main memory device 2200 may temporarily store data to be transmitted to the memory device 2300 and the input/output device 2400.

The memory device 2300 may include a memory controller 2310 and a storage medium 2320. The memory device 2300 may be configured and operate in a way substantially similar to the data storage device 10 of FIG. 1.

The input/output device 2400 may be or include a keyboard, a scanner, a touch screen, a mouse, or the like, capable of exchanging data with a user, such as receiving a command for controlling the data processing system 2000 from the user or providing a processed result to the user.

According to an embodiment, the data processing system 2000 may communicate with at least one server 2700 through a network 2600 such as a LAN (local area network), a WAN (wide area network), a wireless network, and so on. The data processing system 2000 may include a network interface unit (not shown) to access the network 2600.

While various embodiments including a data storage device and an operating method thereof have been described above, it will be understood to those skilled in the relevant art that the embodiments described are examples only and that many other embodiments or variations thereof may be envisaged by the skilled person in the relevant art without departing from the spirit and/or scope of the present invention as defined in the appended claims.

What is claimed is:

1. A data storage device comprising:
a nonvolatile memory device including a memory block, to which a write operation is interrupted and not completed due to at least one time occurrence of a sudden power-off (SPO) of the data storage device, wherein the memory block includes at least one first valid page group including one or more valid pages caused before the interruption and at least one invalid page group having one or more invalid pages caused by the interruption; and
a controller suitable for:
writing at least one physical address-to-logical address (P2L) list for the first valid page group of the memory block into the invalid page group of the memory block after power-on of the data storage device following the SPO, and
recovering an address mapping table for the memory block based on the P2L list after completion of the write operation to the memory block.

2. The data storage device according to claim 1, wherein the controller detects the invalid page group by scanning the memory block in reverse direction of the write operation to the memory block, and
wherein the write operation starts from a first page of the memory block and finishes with the last page of the memory block.

3. The data storage device according to claim 1, wherein the controller further writes the P2L list in one or more empty pages successive to the invalid page group.

4. The data storage device according to claim 1, wherein the controller controls the nonvolatile memory device to resume the write operation to remaining pages of the memory block other than the first valid page group and the invalid page group in order to complete the write operation to the memory block.

5. The data storage device according to claim 4,
wherein the controller further generates a P2L list for a second valid page group including one or more valid pages, to which the write operation is resumed after the SPO, by scanning the remaining pages of the memory block in reverse direction of the write operation to the memory block after completion of the write operation to the memory block, and
wherein the controller recovers the address mapping table based on the P2L lists for the first and second valid page groups.

6. The data storage device according to claim 5, wherein, in the case where the P2L list for the first valid page group stored in the invalid page group are abnormal, the controller generates again the P2L list for the first valid page group by scanning the first valid page group in order to recover the address mapping table, and
wherein where the P2L list are abnormal means the P2L list are not valid data.

7. The data storage device according to claim 1,
wherein, when the SPO occurs a plurality of times, the controller writes a plurality of P2L lists for a plurality of first valid page groups into a plurality of invalid page groups, respectively,
wherein the plurality of first valid page groups respectively correspond to plural occurrences of the SPO, and the plurality of invalid page groups respectively correspond to the plural occurrences of the SPO, and
wherein the controller further stores location information of a previous invalid page group into a next invalid page group in the plurality of invalid page group.

8. The data storage device according to claim 7, wherein the controller reads the plurality of P2L lists by locating the plurality of invalid page groups through the location information stored in each of the invalid page groups.

9. A method for operating a data storage device including a nonvolatile memory device including a memory block, to which a write operation is interrupted and not completed due to at least one time occurrence of a sudden power-off (SPO) of the data storage device, wherein the memory block includes at least one first valid page group including one or more valid pages caused before the interruption and at least one invalid page group having one or more invalid pages caused by the interruption, the method comprising:
writing at least one physical address-to-logical address (P2L) list for the first valid page group of the memory block into the invalid page group of the memory block after power-on of the data storage device following the SPO; and
recovering an address mapping table for the memory block based on the P2L list after completion of the write operation to the memory block.

10. The method according to claim 9, further comprising:
detecting the invalid page group by scanning the memory block in reverse direction of the write operation to the memory block,
wherein the write operation starts from a first page of the memory block and finishes with the last page of the memory block.

11. The method according to claim 9, wherein the writing of the P2L list includes writing the P2L list in one or more empty pages successive to the invalid page group.

12. The method according to claim 9, further comprising resuming the write operation to remaining pages of the memory block other than the first valid page group and the invalid page group in order to complete the write operation to the memory block.

13. The method according to claim 12,
further comprising generating a P2L list for a second valid page group including one or more valid pages, to which the write operation is resumed after the power-on, by scanning the remaining pages of the memory block in reverse direction of the write operation to the memory block after completion of the write operation to the memory block, and
wherein the recovering of the address mapping table is performed on the basis of the P2L lists for the first and second valid page groups.

14. The method according to claim 13, wherein, in the case where the P2L list for the first valid page group stored in the invalid page group are abnormal, the recovering of the address mapping table includes generating the P2L list for the first valid page group by scanning the first valid page group, and
wherein where the P2L list are abnormal means the P2L list are not valid data.

15. The method according to claim 14,
wherein, when the SPO occurs a plurality of times, the writing the P2L list is performed by writing a plurality of P2L lists for a plurality of first valid page groups into a plurality of invalid page groups, respectively, wherein the plurality of first valid page groups respectively correspond to plural occurrences of the SPO, and the plurality of invalid page groups respectively correspond to plural occurrences of the SPO, and further comprising storing location information of a previous invalid page group into a next invalid page group in the plurality of invalid page groups.

16. The method according to claim 15, wherein the recovering of the address mapping table comprises reading the plurality of P2L lists by locating the plurality of invalid page groups through the location information stored in each of the invalid page groups.

* * * * *